(12) United States Patent
Coates et al.

(10) Patent No.: US 6,824,872 B2
(45) Date of Patent: Nov. 30, 2004

(54) SURFACE-TREATING FLUOROPOLYMER POWDERS USING ATMOSPHERIC PLASMA

(75) Inventors: Michael Coates, Moorestown, NJ (US); Wes Demonde, Newtown Square, PA (US); Kurt Davidson, Collegeville, PA (US)

(73) Assignee: Laurel Products LLC, Moorestown, NJ (US)

( * ) Notice: Subject to any disclaimer, the term of this patent is extended or adjusted under 35 U.S.C. 154(b) by 40 days.

(21) Appl. No.: 10/128,185

(22) Filed: Apr. 23, 2002

(65) Prior Publication Data

US 2004/0033358 A1 Feb. 19, 2004

(51) Int. Cl.$^7$ ................................................. B32B 5/66
(52) U.S. Cl. ....................... 428/403; 428/407; 428/327; 427/212; 427/222; 427/302; 427/487; 427/521
(58) Field of Search .............................. 428/403, 407, 428/327; 427/212, 222, 302, 487, 521

(56) References Cited

U.S. PATENT DOCUMENTS

| | | | |
|---|---|---|---|
| 4,287,032 A | | 9/1981 | Pellegri |
| 5,069,926 A | | 12/1991 | Iwata et al. |
| 5,100,689 A | | 3/1992 | Goldberg et al. |
| 5,176,938 A | | 1/1993 | Wallsten et al. |
| 5,283,086 A | | 2/1994 | Kodama et al. |
| 5,322,737 A | | 6/1994 | Morra et al. |
| 5,424,160 A | * | 6/1995 | Smith et al. ............ 430/111.32 |
| 5,576,106 A | * | 11/1996 | Kerbow et al. ............. 428/403 |
| 5,756,199 A | * | 5/1998 | Kerbow et al. ............. 428/327 |
| 5,859,086 A | | 1/1999 | Freund et al. |
| 6,074,534 A | | 6/2000 | Goudmand et al. |
| 6,515,066 B2 | * | 2/2003 | Allen et al. .................. 524/520 |
| 2002/0161067 A1 | | 10/2002 | Udagawa et al. |

FOREIGN PATENT DOCUMENTS

| | | |
|---|---|---|
| EP | 0 214 880 A1 | 3/1987 |
| EP | 0526797 A1 * | 2/1993 |
| EP | 1 007 584 B1 | 10/2003 |
| WO | WO 99/07549 | 2/1999 |

OTHER PUBLICATIONS

Article—Multi–Layer Coating of Ultrathin Polymer Films on Nano–Particles of Alumina by a Plasma Treatment, Donglu Shi et al., Dept. of Materials Science and Engineering, University of Cincinnati, pp1–6.

Internet Search Results (Google) Sep. 7, 2001—Atmospheric Plasma Treatment, 2 pp.
Webpage—Sigma Technologies Int'l Inc.; Surface Treatment Systems, 1 pg.
Webpage—Enercon Industries Corporation; Revolutionary Breakthrough in Surface Treating—Atmospheric Plasma Treating, 1 pg.
Article—Antifouling Poly(Vinylidene Fluoride) Microporous Membranes Prepared via Plasma–Induced Surface Grafting of Poly(Ethylene Glycol), Peng Wang, et al., Adhesion Sci. Tgechnol., vol. 16, No. 2, pp111–127, 2002.
Article—Atmospheric Plasma—The New Functional Treatment for Films, A. Yializis et al., 2000 TAPPI Polymers, Laminations & Coating Conference, pp 1343–1352.
Copy of International Search Report issued in PCT/US03/04395 on Sep. 8, 2003.
Article—*Plasma–induced immobilization of poly*(*ethylene glycol*) *onto poly*(*vinylidene fluoride*) *microporous membrane*, Peng Wang, Journal of Membrane Science 195 (2002), pp 103–114.
Article—*Surface carboxylation of PEEK film by selective wet–chemistry*, Henneuse et al., Polymer vol. 39, No. 4, 1998, pp 835–844.
Article—*Surface animation of PEEK film by selective wet–chemistry*, Henneuse–Boxus et al, Polymer vol. 39, No. 22, 1998, pp 5359–5369.
Article—"Plasma–inducted immobilization of poly(ethylene glycol) onto poly (vinylidene fluoride) microporous membrane", Wang et al., Journal of Membrane Science 195 (2002) pp 103–114.
Article—"Plasma–inducted immobilization of poly(ethylene glycol) onto poly (vinylidene fluoride) microporous membrane", Wang et al., Journal of Membrane Science 195 (2002) pp 103–114.

* cited by examiner

*Primary Examiner*—Leszek Kiliman
(74) *Attorney, Agent, or Firm*—Baker & Daniels

(57) ABSTRACT

Fluoropolymer powder particles which are surface treated so as to change the chemical functionality on their surfaces which in turn changes the surfaces characteristics. These characteristics improve the usefulness of these powders and can make them wettable. The surface treated fluoropolymer particles are subject to an atmospheric plasma treatment process, and preferably pretreated with a macromolecular chemical species prior to the atmospheric plasma treatment. The atmospheric plasma treatment enhances adhesion to the powder surface and can also enhance cross-linking of the macromolecular chemical species. The surface treated fluoropolymer powders can be used to form fluoropolymer coatings on various substrates.

42 Claims, 1 Drawing Sheet

SURFACE-TREATING FLUOROPOLYMER POWDERS USING ATMOSPHERIC PLASMA

TECHNICAL FIELD

The present invention relates to fluoropolymer powders. More particularly, the present invention is directed at producing a novel fluoropolymer powder by immobilizing macromolecules on the surface of these powders using atmospheric plasma and other techniques.

BACKGROUND ART

Fluoropolymers, are defined herein broadly as any of the fluorine containing polymers, including homopolymers, copolymers, and terpolymers that have non-wettable and chemical inert surfaces which, although being desired in some applications, limit the use of these materials in other applications.

The technology of coating of articles with fluoropolymers has been developing along two fundamentally distinctive directions based on the physical form of powder and latex fluoropolymers. In each case, the final coating (a continuous film layer) is obtained by heating the applied fluoropolymers above their melting.

Processes and products have been developed which provide specific advantages for powder and latex fluoropolymer applications. For technologies that use powdered fluoropolymers, modified polymer compositions and particle sizes and shapes have been developed to advance both the application yield (yield per pass) and the performance of the resulting film per unit film thickness. The major intrinsic obstacle to advancements in the use of powdered fluoropolymers is their poor electrical surface conductivity.

For latexes, the ultra low surface energy and the high specific gravity peculiar to fluoropolymers (they can be defined as being fully hydrophobic) has forced the adoption of different manufacturing technologies since the base polymer synthesis (e.g. dispersion) is characterized by polymer particles having an average diameter two orders of magnitude smaller then powders, and by the extensive use of surfactants, both the fluorinated surfactants used during synthesis, and hydrogenated surfactants for the creaming of diluted dispersion obtained from the synthesis, and for the stabilization and formulation of concentrated latexes manageable by the application techniques (e.g. spray, roll, curtain coating). However, both kinds of surfactants, intrinsic to the technology, are detrimental to the coating application, negatively impacting the yield and the characteristics of the film layer (e.g. film continuity, adhesion to the substrate, etc.).

A way to escape from these two fundamental approaches is theoretically conceivable, and involves the modification of the fluoropolymer particle surface, to make it more compatible with the broad spectrum of available polar carrier means (e.g. water), but without altering/damaging the properties of the fluoropolymer bulk.

Surface treatments of fluoropolymer are known and established in the art. Fluoropolymers in the form of sheets, films and shaped articles have been chemically treated, subject to electrical discharged using corona discharge and plasmas, subject to flame treatment, and subject to physical treatment such as chemical adsorbing procedures. In each instance, desired results have often been less than satisfactory. For example, surface changes effected by chemical treatments produces darkening of the surface and chemical absorbing procedures are subject to deterioration and loss over time. Flame treatments can cause undesired damage if not properly controlled.

Electrical treatments seem to have become the most accepted processes for desired long term effects. However, as discussed below, these treatment processes have limitations.

Corona discharge and flame treatment processes are used for treating the surfaces of polymer films and other substrates such as foils, papers, etc. These treatment processes increase the surface energy of the substrates, which in turn improves the wettability, printability and adhesion on these surfaces. Corona discharges can produce locally concentrated discharges known as streamers. These streamers lead to some non-uniformity in the treatment of the film surfaces, and the concentrated energy of the streamers can also microscopically damage the film surface. Furthermore, corona treatment can produce backside treatment, which is undesirable in many applications.

Flame treatment also has limitations in terms of oxidation surface modification, difficulty in control and possibility of excessive thermal loads.

Plasma treatment is an effective method for treating surfaces to increase surface energy and improve wettability, printability and adhesion. Plasma produces uniform surface treatment without causing backside treatment of the substrate.

Low-pressure or atmospheric plasma treatment (APT) processes have been developed that provide unique advantages over existing technologies for surface treatment. The apparatus used in atmospheric plasma treatment does not require a vacuum system, produces a high-density plasma and provides treatment of various substrates at low temperature while operating at atmospheric pressure. The benefits of plasma treatment include reduced degradation of surface morphology, higher treatment (dyne) levels, elimination of backside treatment, and extended life over treatment time.

As reported by A. Yializis et al. (Atmospheric Plasma—The New Functional Treatment for Film, 2000 TAPPI Polymers, Laminations, & Coatings Conference pp. 1343–1352), atmospheric plasma treatment processes have been developed for treating continuous webs and films.

DISCLOSURE OF THE INVENTION

According to various features, characteristics and embodiments of the present invention which will become apparent as the description thereof proceeds, the present invention provides a surface treated fluoropolymer powder which includes:

powder particles of a fluoropolymer; and a coating of macromolecules on individual ones of said powder particles.

The present invention further provides a method of providing a wettable and reactive surface characteristic to fluoropolymer powder particles which involves the steps of:

a) providing a fluoropolymer powder;

b) contacting the fluoropolymer powder with a macromolecular chemical species to coat particles of the fluoropolymer powder with macromolecules; and c) subjecting the coated particles from step b) to a process that immobilizes the macromolecules on the surface of the powder particles.

The present invention further provides a method of coating a substrate with a fluoropolymer material which involves the steps of:

a) providing a fluoropolymer powder;
b) contacting the fluoropolymer powder with a macromolecular chemical species to coat particles of the fluoropolymer powder with macromolecules;
c) subjecting the coated particles from step b) to a process that immobilizes the macromolecules on the surface of the powder particles; and
d) applying the surface treated particles to the surface of a substrate.

According to different embodiments of the present invention, the process that is used to immobilize the macromolecules on the surface of the powder particles can be one of atmospheric plasma treatment, x-ray radiation, electron radiation, and ultraviolet radiation, and any other process the effects cross-linking of the macromolecules.

The present invention also provides for a dispersion of the surface treated fluoropolymer powder in a polar solvent, which can be used to produce various articles, compositions and additives.

BRIEF DESCRIPTION OF DRAWINGS

The present invention will be described with reference to the attached drawing, which is given as a non-limiting example only, in which.

BEST MODE FOR CARRYING OUT THE INVENTION

Figure 1:
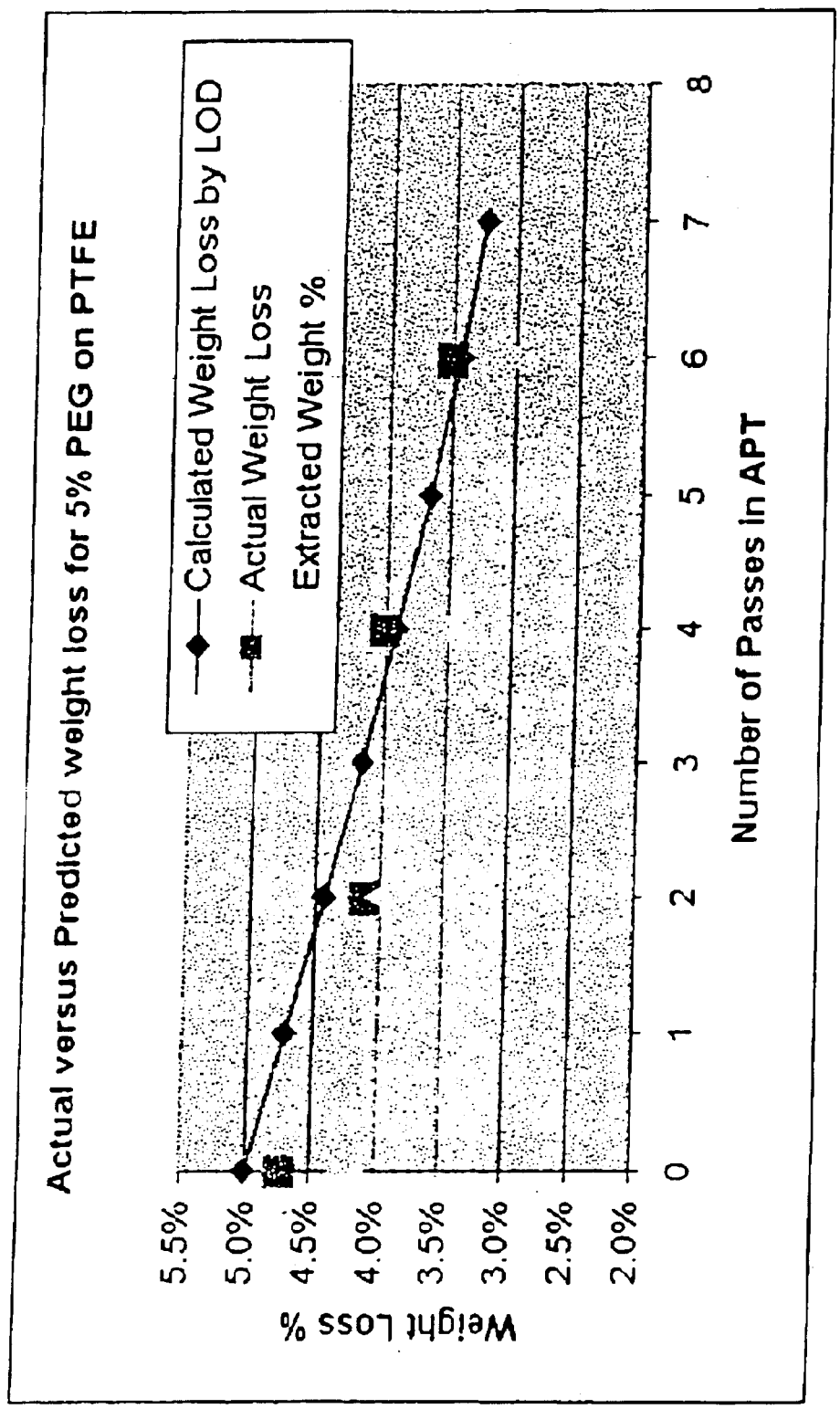
FIG. 1 is a graph which shows weight loss versus number of passes through atmospheric plasma treatment for 5% PEG on PTFE.

The present invention is directed to fluoropolymers, which as defined herein includes any fluorine-containing polymer including homopolymers, copolymers and terpolymers, and fluoroelastomers. Examples of fluoropolymers include:

1. Homopolymers, including: polytetrafluoroethylene (PTFE), polytrifluoroethylene, polyvinylidene fluoride (PVDF), polychlorotrifluoroethylene (PCTFE), and polyvinyl fluoride (PVF);
2. Co-polymers, including: tetrafluoroethylene-hexafluoropropylene know as fluorinated ethylene-propylene (FEP), tetrafluoroethylene and perfluorovinylethers known as MFA and PFA, ethylene and tetrafluoroethylene known as ETFE, ethylene and chlorotrifluoroethylene known as ECTFE, vinylidene fluoride and hexafluoropropene known as fluoroelastomers; and
3. Terpolymers, including: tetrafluoroethylene-hexafluoropropylene-vinylidene fluoride known as THV, vinylidene fluoride, hexafluoropropene and tetrafluoroethylene known as terpolymer fluoroelastomers.

Generally, these are polymers made with one or more of the following specific examples of fluoromonomers including: tetrafluoroethylene, hexafluoropropylene, vinylidene fluoride, vinyl fluoride, trifluoroethylene, chlorotrifluoroethylene, and perfluorovinylesters. Other non-fluoropolymers which are inert such as polyether ether ketone (PEEK) and polyetherimide (PEI) can also be treated according to the present invention.

Fluoropolymers are well known as being inert and because of their extremely low surface energy and non-polarity are non-wettable. Their inertness makes fluoropolymers suitable for use in a variety of applications including bearing materials, non-stick cooking surfaces, etc. However, the inability to become wetted and their extreme chemical inertness as a powder limits their application in other fields of use, in which they would seem to be otherwise very desirable. The surface treatment process of the present invention changes the surface chemistry of the fluoropolymer powder particles so the surface of the particles are chemically reactive and interact with polar solvents, while maintaining the overall characteristics of the bulk fluoropolymer properties.

During the course of the present invention, the inventor determined to apply the most effective surface treatment technologies that are currently used to commercially treat fluoropolymer sheets, film, and other shaped articles to fluoropolymer particles. As a result of these efforts, the present inventor unexpectedly discovered that all known surface treatment technologies were not effective when applied to fluoropolymer powders.

According to the present invention, powders are defined as a material having a physical size of less than 100 microns, with no length to diameter restrictions or minimum particle diameter.

In attempting to apply atmospheric plasma treatment to fluoropolymer powders using existing techniques and technologies, it was discovered that the high surface area of the powders prohibited effectiveness of the treatment even when atmospheric plasma treatment was carried out in the presence of reactive molecules in the gas phase. This is in contrast to the effectiveness of these techniques and technologies when they are used to treat PTFE sheet surfaces, where individual fluorine atoms are reacted and substituted by other small chemical species to leave reactive groups on the sheet surface. It is believed that the difference results can be attributed to the fact that the unit surface area of a sheet or film of PTFE is very small as compared to a powder which can have a surface area of 1 to 20 $m^2/g$. The initial results of these tests indicate that existing techniques and technologies are uncompetitive for handling the high surface values of fluoropolymer powders—residence time and power input would be far too great.

Accordingly, the present invention involves chemically treating fluoropolymer powders prior to subjecting them to atmospheric plasma treatment. The results of testing this treatment protocol demonstrate that the new surface treatment is much more effective and permanent than that of surface treatment without prior chemical treatment. Moreover, it was unexpectedly discovered that the prior chemical treatment of the powders allowed subsequent atmospheric plasma treatment of the powders despite their large surface area.

The present invention surface treats fluoropolymer powders by first contacting the powders with macromolecule chemical species which can be dissolved in a solvent, including water. The chemical species is mixed together with the fluoropolymer powder so that an intimate mixture is obtained. The mixing can be accomplished in any suitable stirred vessel such as a PK blender. In addition, as discussed below, a cross-linking agent can be included as discussed below.

After mixing, the resulting product is subject to a heating process that removes the solvent and leaves a dry macromolecule which is uniformly distributed and closely held on the surface of the fluoropolymer powder particles. The concentration of the macromolecule chemical species is from about 0.1 to about 25 wt. %, with a concentration of from about 0.2 to about 5 wt. % being generally useful for purposes of the present invention. Higher surface area polymer powders will require more of the macromolecule chemical species than lower surface area polymer powders. Concentrations can also vary depending on the molecular weight of the macromolecule chemical species.

Macromolecules having repetitive units are particularly useful for purposes of the present invention. Polyvinyl alcohol, poly vinyl pyrrilidone, polyethylene glycol and poly acrylic acid are non-limiting examples of such macromolecules that provide significant functionality per molecule.

It has been found that it is more effective to add a poly acrylic acid than add its monomer in the atmospheric plasma treatment since the density at which the molecule is attached to the surface of polymer powder particles is dependent upon both the concentration of the molecule on the surface of the powder and the density of the ionized, reaction-inducing species in the plasma. Moreover, it is impossible to obtain the concentration of the monomer on the surface of the powder particles equivalent to that obtained using the macromolecules and the pre-blending techniques. It is presumed that the ionized species cause the reaction of the macromolecule with itself, with a gradient of linking that is positive from the particle surface to the outer surface, while the use of a cross-linking agent produces a profile that is the opposite or flat. A decrease in the molecular weight of the macromolecule, has been observed which is consistent with the fact that the ionized species in the plasma are effective in bringing about chemical reaction and even chain scission of the macromolecule. The macromolecule develops a strong physical interaction with the fluoropolymer powder particle surface, which surprisingly becomes irreversible (they no longer can be dissolved in polar solvents) after the cross-linking. Thus, functionality can be effectively attached to the powder particle surfaces without resorting to massive ion densities and/or long residence times in the plasma.

By titrating both alcohol and acid functions of the surface treated fluoropolymer powder particles the present inventor has concluded that the degree of surface treatment is in agreement with theoretical calculations. It is assumed that these chemical species can react with other species and thus improve the incorporation and result in better blends and physical properties. This assumption has been proven true experimentally by comparing both the uniformity of fluoroelastomer/micropowder as compared to non-surface treated equivalents by increases in the uniformity and hardness of the comparative films produced, the increase in mixing temperatures and the physical properties of the final product.

Subsequent extraction tests have shown that the percentage of the macromolecule chemical species attached to the surface of the fluoropolymer powder particles varies from about 40 to about 100 wt. % and is: inversely proportional to the concentration of the macromolecule, i.e. lower concentrations are more fixed; dependent on the macromolecule and fluoropolymer species; dependent on the residence time in the plasma and the type of gas/gas mixture of the plasma; and proportional to the power density of the plasma. This is also valid for macromolecule cross-linking.

The plasma gases, gas mixtures and macromolecular chemical species all affect the chemistry of the surface treatment. In one example according to the present invention, when oxygen was added to a PTFE powder during treatment with PVOH, the acidity of the sample was raised by a factor of three (caused by oxidation of the alcohol to an acid) as compared to a similar non-oxygenated treatment process.

Tests were conducted in which non-pretreated fluoropolymer powders were subject to atmospheric plasma treatment during which ammonia and low molecular weight reactive gases were added. The results of these tests showed that there was a poor concentration of the reacted species from the reactive gas addition on the surfaces of the polymer powder particles. These tests indicate that addition of small molecular chemical species during the atmospheric plasma treatment was ineffective for surface treating the fluoropolymer powders.

It was concluded that the addition of the macromolecular chemical species does not necessarily have to be done using pre-solvent mixing followed by solvent removal by heat. Alternatively, concurrent addition of a solvent solution incorporating the macromolecule chemical species just prior to, or contemporaneously with, the atmospheric plasma treatment is foreseeable according to the present invention. According to a further embodiment, the macromolecules could be provided in a liquid form without a solvent and applied directly to the fluoropolymer powders.

In order to test the wettability of surface treated fluoropolymer powders produced according to the present invention, samples were made by pretreating PTFE with PVOH and subjecting the resulting pretreated polymer powder to atmospheric plasma treating. Up to 50 wt. % of the surface treated PTFE was mixed with water and agitated in a pressure mill to produce a consistent paste that was found to be storage stable or could be easily resuspended by simple mixing. In other formulations, 40 wt. % of the surface treated PTFE powder was mixed with water to form a paste. It was found that these pastes can be easily incorporated into other systems without the use of surfactants or other wetting agents.

In comparative tests, it was found that untreated PTFE powder was so hydrophobic that it could not be mixed with water without the addition of surfactants, typically concentrations of from about 1 to about 7 wt. % are needed.

Using the techniques of the present invention, pastes were made from surface treated powders of PTFE (micropowders), virgin PTFE, FEP and PVDF. These pastes were sprayed onto aluminum panels (with or without dilution), and the residual water was flashed off at 200° F. The coatings on the panels were then cured at temperatures above the melting point of the fluoropolymer powders.

When curing was finished, the surface treated polymer pastes demonstrated excellent adhesion in all cases to the aluminum panels (untreated PTFE powders are not water suspendable without a surfactant aid and even with a surfactant may not form cohesive films). Mud crack-free films of various thicknesses from 0.03 to about 1 mils were produced. All the films were uniform and had good gloss characteristics. Both the surface treated FEP, ECTFE and PVDF films demonstrated very good physical properties.

Surface treated PVDF gave a much better MEK rub resistance as compared to untreated PVDF powder suspended with the use of a surfactant, and did not crack when subject to boiling water over a 0 bend. The MEK rub resistance referred to is a standard solvent resistance test which involves rubbing a surface coated with a cloth soaked in methyl ethyl ketone, and measuring the number of double finger rubs (a double rub is one forward and one reverse rub) to rub through the film.

When surface treated PTFE micropowder was added to Ausimont's fluoroelastomer TN latex it showed excellent incorporation as compared to non-treated PTFE and when sprayed and cured at 805° F. produced a tough, strong film. Similar surface treated fluoropolymer powder coating applied to glass panel demonstrated excellent adhesion.

The aqueous pastes produced by mixing the surface treated fluoropolymer powders in water demonstrate novel properties.

In a surfactant suspended fluoropolymer powder system, the surfactant is not "locked" to the polymer powder particles. Rather, it equilibrates between the aqueous phase, the particles and other hydrophobic surfaces. This usually results in detrimental performance. For example, in surface coating applications, achievable adhesion will be reduced caused by the surfactant equilibrating between the water, polymer and surface to be coated, resulting in a barrier to adhesion.

Also in surfactant suspended fluoropolymer powder systems, the surfactant "holds" water up to relatively high temperatures and thus can increase mud cracking as the coating system dries.

In polymerized aqueous dispersions of PTFE there is normally present a fluorosurfactant (APFO), which when used in conjunction with a normal surfactant such as Triton X-100 forms a stable dispersion. In the surface treated fluoropolymer powder aqueous paste compositions of the present invention, hydrocarbon and APFO surfactants are completely absent. This is significant when considering that APFO is a known bio-accumulator and its role in coating systems is usually detrimental.

In contrast to typical surfactants, the surface treated fluoropolymer powders of the present invention have completely hydrophilic molecules attached thereto capable of maintaining a stable powder particle dispersion. And yet the hydrophilic molecules behave in a similar manner to surfactants, but they are immobilized (cannot migrate) and they are surprisingly effective in providing stable dispersion at a concentration that, percent wise to the fluoropolymer, is much lower in respect to latexes of the art.

The molecules used in the surface treated fluoropolymer powder aqueous paste compositions of the present invention are "environmentally friendly."

During the course of the present invention it has been it has been found that the amount of the macromolecular chemical species required to make PTFE powder sufficiently wettable so that it can be used to form a uniform paste is approximated for polyethylene glycol as:

| Particle Diameter (microns) | 0.2 | 1 | 5 | 30 | 100 |
|---|---|---|---|---|---|
| Surface Area/gram (m$^2$/g) | 15 | 3 | 0.6 | 0.1 | 0.003 |
| PEG/PTFE (wt. %) | 11.5 | 2.3 | 0.5 | 0.1 | 0.02 |

Different surface treated fluoropolymer powder aqueous paste compositions produced according to the present invention can be mixed to obtain improved and unexpected results. For example, adding FEP to a low molecular weight micropowder enhances the physical strength of the resulting film.

This invention provides, through a novel combination of process steps already available in the art, a new product represented by powders of various fluoropolymers surface treated along the present invention, which falls in-between the fluoropolymer powders and fluoropolymer latexes of the art and, because of advantages in respect to each, is capable of polarizing the existing application technologies towards this new third way of making fluoropolymers more compatible with effective and environmental friendly mean of application.

According to an alternative embodiment of the present invention, immobilization of the macromolecular chemical species can be accomplished by the use of a cross-linking agent, such as, for example, an organic peroxide, that can be combined with the macromolecular chemical species prior to (or during) the coating of the fluoropolymer powder particles. Thereafter, the coated fluoropolymer powder particles can be heated to effect cross-linking of the macromolecules (by decomposition of the cross-linking agent into reactive species) without subsequent atmospheric plasma treatment (which can still be optionally used).

The following non-limiting Examples illustrate various features and characteristics of the present invention which are not to be construed as limited thereto. Throughout the Examples and elsewhere herein percentages are by weight unless otherwise indicated.

EXAMPLE 1

Surface Treatment of Powders

In this Example fluoropolymer powder particles were surface treated with a number of macromolecular chemical species.

Table 1 lists the fluoropolymer powders, their average particle size and molecular weight. Table 2 lists the macromolecular chemical species, their molecular weights, minimum and maximum concentrations, cross linking-agents and concentrations of the cross-linking agents.

TABLE 1

| Base Powder | Average Particle Size. $D_{50}$ Microns | Molecular Weight |
|---|---|---|
| PTFE | 35 | >1 × 10$^6$ |
| Irradiated PTFE | 3 to 15 | 1 × 10$^3$–1 × 10$^6$ |
| PVDF | 5 | Melt Viscosity 30 Kp @ 232° C. |
| FEP | 5 to 25 | Melt Index 2 to 20 @ 375° C. |
| ECTFE | 25 | Melt Index 12 |

TABLE 2

| Macromolecular | Commercial Name | Typical Molecular weight | Min Conc. gm/gm of powder | Max Conc. gm/gm of powder | Cross-linking agent | Typical conc. cross-linking agent gm/gm of macromolecule |
|---|---|---|---|---|---|---|
| PEG | | 300, 900 and 1450 | 0.003 | 0.1 | Polycup 172 | 0.1 |
| PVOH | Celvol 502 | 15,000 | 0.001 | 0.05 | Polycup 172 | 0.1 |
| PAA | | 90,000 | 0.003 | 0.05 | Diak #3 | 0.05 |
| Epoxy Functional Silane | Coatasil 1770 | 288 | 0.02 | 0.02 | Hydrolysis | 0 |

TABLE 2-continued

| Macromo-lecular | Commercial Name | Typical Molecular weight | Min Conc. gm/gm of powder | Max Conc. gm/gm of powder | Cross-linking agent | Typical conc. cross-linking agent gm/gm of macromolecule |
|---|---|---|---|---|---|---|
| Non Ionic Silane | Silquest 1230 | >300 | 0.02 | 0.02 | Hydrolysis | 0 |
| PVP | Plasdone C-15 | Unknown | 0.02 | 0.02 | None | 0 |

Polycup 172 = polyamide-epichlorohydrin
Diak #3 = diamine

To surface coat the fluoropolymer powder particles, a measured amount of the fluoropolymer powder (typically 2 Kg) was charged into a commercial solid/liquid blender. The blender was then started and a desired amount of the macromolecular chemical species (typically 10 gm) and a desired amount of cross-linking agent (typically 0.25 gm) was added to the blender and the blending blades were started. The mixture was blended for about 15 minutes. After mixing, the material was placed on a tray and dried in a 104° C. oven for about 2 hours. Evaporation of was determined by measuring weight loss. After drying, the dried material was heated in a 150° C. oven to activate the cross-linking agent.

The surface coated fluoropolymer powders were subject to atmospheric plasma treatment by passing the powders through a plasma along a vibrating trough. A treatment apparatus was set up which included a vibrating trough, plasma electrodes, a readily ionizable gas supply, an optional reactive gas supply, and cooling systems for the electrodes and the vibrating trough (to transport the fluoropolymer powders through the plasma). An air flow was initiated to cool the electrodes and water was used to cool the vibrating trough. A flow of ionizable gas (e.g. 2990 ml/min Helium) was provided together with an optional reactive gas, when used (e.g. 300 ml/min oxygen). The electrical power to the electrodes was adjusted to about 1.5 kilowatts to create a plasma. The vibrating trough was adjusted to transport about 0.25 kg/min of the fluoropolymer through the plasma. The fluoropolymer powder can be repeatedly passed though the plasma a number of times to obtain desired properties. A similar APT process is used for fluoropolymer powders that are either pretreated (coated) or not pretreated with a macromolecular chemical species.

EXAMPLE 2

Hydroxyl and Acid Numbers

Titrating both alcohol and acid functions of the surface treated fluoropolymer powder particles can be used to determine the degree of surface treatment.

In this Example the method of ASTM D 1957–86 was followed. This method utilizes acetylation reaction, which converts the primary alcohol to an ester through reaction with acetic anhydrate, liberating one mole of acetic acid. Upon hydrolysis, the same will require less potassium hydroxide to reach the phenolphthalein end point (neutralization) relative to a control, which upon hydrolysis yields 2 moles of acetic acid.

In this Example, 10.0 g of each individual surface treated powder was placed in a 250 ml Erlenmeyer flask and the total weight of the sample and flask were recorded. 5 ml of 3:1 volume mixture of pyridine: acetic anhydride were added to the flask.

9.0–11.0 g of the same sample was placed in a second flask for acid value titration and the total weight of the sample and flask was recorded. 10 ml pyridine was added to the second flask.

Both flasks were provided with refluxing condensers and the contents were stirred and heated to 100° F. for one hour. After heating 10 ml of water was added to each flask and the contents were allowed to cool for 10 minutes.

After cooling, 25 ml butyl alcohol was added to each flask through the refluxing condensers. Then 1 ml phenolphthalein was added to each flask and neutralized with 0.5 N potassium hydroxide in ethanol solution.

The hydroxyl value was calculated by the equation:

Hydroxyl value=$B+(SA/C)-V]/S \times N(56.1)$ where A=KOH solution required for titration of the acid value in ml; B=KOH solution required for titration of the reagent blank in ml; C=sample used for the acid value in grams; V=KOH solution required for titration of the acetylated specimen in ml; and S=sample for acetylation in grams; and N=normality (0.5).

Typical hydroxyl and acid numbers for several samples of surface treated fluoropolymer powders are give in Table 3.

TABLE 3

| Polymer | Macro-molecular | Concentration on the Polymer (wt. %) | Number passes through APT | Acidity (mgs) KOH/gm | Hydroxyl Value |
|---|---|---|---|---|---|
| Higher molecular wt. micropowder | None | 0 | 0 | 0.3 | — |
| PTFE micropowder | None | 0 | 0 | 0.9 | — |
| PTFE micropowder | PEG 900 | 5.0 | 2 | 1.2 | — |
| PTFE micropowder | PEG 900 | 5.0 | 4 | 1.4 | — |
| PTFE micropowder | PEG 900 | 5.0 | 6 | 1.7 | 2.9 |
| PTFE micropowder | PAA | 2.0 | 6 | 13.2 | — |
| PTFE micropowder | PVOH | 2.0 | 0 | 0.3 | 21.0 |
| PTFE micropowder | PVOH | 2.0 | 2 | 0.8 | 16.4 |
| PTFE micropowder | PVOH | 2.0 | 6 | 0.6 | 16.7 |

The results of this Example were used to verify that the degree of surface treatment achieved in practice is in general agreement with theoretical calculations.

EXAMPLE 3

Weight Loss and Extraction Results

In this Example extraction tests were performed to determine the amount of surface treated material which is neither covalently attached nor permanently adsorbed one the fluoropolymer powder.

About 5 g of each sample was placed on an analytical balanced and the weight was recorded. 60 ml of an appropriate solvent (isopropanol for polyethylene glycol, deionized water for polyvinyl alcohol, etc.) was mixed with the sample. The mixture was mixed for 2 hours over low heat (about 100° F.). After heating the sample mixture was poured into a 150 ml Durapore™ 0.22 μm filtration device. The material that was removed as the solvent passes through the filter and was collected. The total weight of the solvent (containing the extracted material) was recorded. About 1 g of the solvent was placed into a aluminum weighting dish and the total weight of the solvent and dish are weighed. The solvent was evaporated in a vented oven that was heated to 100° C. The percentage of material extracted was calculated by the equation:

$$E=100\times[(F-P)/S]\times T/W$$

where E=percentage of surface treatment extracted; F=final weight of pan and extracted material after evaporation; P=tare pan weight; S=sample weight of solvent for percent solids test; T=total weight of solvent; W=weight of fluoropolymer sample.

The procedure of this Example was used to produce the graph of FIG. 1 which shows weight loss versus number of passes through atmospheric plasma treatment for 5% PEG on PTFE. The graph includes a comparison between actual measured values versus predicted weight loss. In FIG. 1, weight loss was measured at 200° C. for 2 hours. Extraction was achieved by washing the polymer with excess water.

FIG. 1 shows that the amount of PEG attached to the polymer (and not removed by evaporation or extraction) increases as treated PTEF is repetitively passed through the APT. Since the hydroxyl values do not follow the empirical predicted weight loss in FIG. 1 which show a downward trend with APT it can be concluded that the PEG was not being evaporated.

EXAMPLE 4
Spray Test Results

In this Example surface treated fluoropolymer powders were formed into pastes that were sprayed onto aluminum panels to test coating properties.

Pastes having 40 wt. % solids were prepared by placing a desired amount of deionized water into a mixing bowl and creating a vortex. Next, enough fluoropolymer powder was introduced directly into the vortex to produce a mixture having 40 wt. % solids. The mixing was continued until the mixture was homogeneous and then the mixture was passed through a horizontal mill.

The powder pastes were sprayed onto aluminum Q-panels using an air assisted Binks Model 69 spray gun with a #66S fluid nozzle and #66SD air cap. Additional water can be used if necessary for ease of spraying as determined by the operator. After spray coating the panel were then flashed to remove water in a well-ventilated oven for 2 minutes at 100° C. The coated panels were then cured for approximately 10 minutes at a temperature of about 30° C. above the melting point of the fluoropolymer.

The thickness of the films was in the range of 0.1–1.0 mil (dry film thickness). The films were rated according to critical cracking thickness, film integrity, flexibility and overall appearance, including gloss, color, etc.

Data and analysis of several coatings are presented in Table 4.

TABLE 4

| Polymer | Macromolecule | Cure Temp | Thickness | Film Quality |
|---|---|---|---|---|
| PTFE micropowder | None | | N/A | Cannot disperse PTFE in water without surfactant. |
| PTFE micropowder | None 1% Triton X | 805 | 0.25 | Some mud cracking. Good film, average adhesion, poor physicals. |
| PTFE micropowder | 0.5% PVOH | 805 | 0.85 | No mud cracking. Good film. Good adhesion, poor physicals. |
| PTFE micropowder | 2% PAA | 805 | 0.3 | No mud cracking. Good gloss, Clear. Good adhesion, poor physicals. |
| PTFE micropowder | 2% PAA + PEG | 805 | 0.15 | No mud cracking. Good gloss. Good adhesion, poor physicals. |
| PTFE micropowder | 5% PEG | 805 | 0.5 | No mud cracking. Good gloss. Some browning. Good adhesion, poor physicals. |
| FEP | 0.5% PVOH | 750 | 0.1 | Very good adhesion. Very good gloss. Tough coating. |
| PVDF | None 1% Triton X | 550 | 0.1 | Poor adhesion. Very good gloss. Tough coating. Poor resistance to MEK rub and poor bend test performance. |
| PVDF | 0.5% PVOH | 550 | 0.1 | Very clear. Very good adhesion. Decent gloss. Tough coating |

The results shown in Table 4 indicate that the surface treated fluoropolymer polymer powders produced according to the present invention can be used to produce fluoropolymer surface coatings according to relatively simple and efficient spray processes.

The surface treated polyfluoropolymers powders of the present invention can be used to produce various articles, compositions and additives. Several exemplary examples include fillers, extrusion aids, additives in oils, greases and other lubricants, and additives in and inks, paints and coating compositions.

In addition to atmospheric plasma treatment, during the course of the present invention, it was also determined that other process such as x-ray radiation, electron radiation, and ultraviolet radiation, could be used to immobilize the macromolecules on the surfaces of the fluoropolymer powders by effecting cross-linking.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above.

What is claimed is:

1. A surface treated fluoropolymer powder which comprises:
   powder particles of a fluoropolymer; and
   a layer of macromolecules on said powder particles, said macromolecules being polymers consisting essentially of hydrophilic monomers.

2. A surface treated fluoropolymer powder according to claim 1, wherein the macromolecules are cross-linked to one another.

3. A surface treated fluoropolymer powder according to claim 2, wherein the cross-linked macromolecules are cross-linked by atmospheric plasma treatment.

4. A surface treated fluoropolymer powder according to claim 1, wherein the macromolecules consist essentially of at least one of polyvinyl alcohol, polyvinyl pyrrilidone, polyethylene glycol, poly acrylic acid and mixtures thereof.

5. A surface treated fluoropolymer powder according to claim 1, wherein the fluoropolymer powder particles are produced by polymerization of at least one of the following fluoromonomers: tetrafluoroethylene, vinylidene fluoride, hexafluoropropylene, vinyl fluoride, trifluoroethylene and chlorotrifluoroethylene.

6. A surface treated fluoropolymer powder according to claim 1, wherein the fluoropolymer powder particles comprise at least one of
   the following polymers: polytetrafluoroethylene, polychlorotrifluoroethylene, polyvinylidene fluoride, polyvinylfluororide; or
   the following copolymers: tetrafluoroethylene-hexafluoropropylene, tetrafluoroethylene-perfluorovinylether, tetrafluoroethylene-ethylene, hexafluoroethylene-vinylidene fluoride, tetrafluoroethylene-ethylene, ethylene chlorotrifluoroethylene; or
   terpolymers of: tetrafluoroethylene-hexafluoropropylene-vinylidene fluoride, or
   mixtures thereof.

7. A surface treated fluoropolymer powder according to claim 1, wherein the fluoropolymer powder particles have a particle size of less than about 100 microns.

8. A surface treated fluoropolymer powder according to claim 1, wherein the macromolecules are covalently bonded to surfaces of the fluoropolymer powder particles.

9. A substrate coated with the surface treated fluoropolymer powder of claim 1.

10. An article of manufacture comprising a coating including the surface treated fluoropolymer powder of claim 1.

11. A method of providing a modified surface characteristic to fluoropolymer powder particles which comprises the steps of:
   a) providing a fluoropolymer powder;
   b) contacting the fluoropolymer powder with a macromolecular chemical species to coat particles of the fluoropolymer powder with macromolecules, the macromolecules being polymers consisting essentially of hydrophilic monomers; and
   c) subjecting the coated particles from step b) to a process that immobilizes the macromolecules on the surface of the powder particles.

12. A method of providing a modified surface characteristic to fluoropolymer powder particles according to claim 11, wherein the process to which the coating particles are subject to in step c) comprises at least one of atmospheric plasma treatment, x-ray radiation, electron radiation, ultraviolet radiation, and heating.

13. A method of providing a modified surface characteristic to fluoropolymer power particle according to claim 11, wherein the macromolecules are immobilized in step c) by cross-linking the macromolecules.

14. A method of providing a modified surface characteristic to fluoropolymer powder particles according to claim 11, wherein the macromolecules consist essentially of at least one of polyvinyl alcohol, polyvinyl pyrrilidone, polyethylene glycol, poly acrylic acid, copolymers thereof, and mixtures thereof.

15. A method of providing a modified surface characteristic to fluoropolymer powder particles according to claim 11, wherein the fluoropolymer powder particles are produced by polymerization of at least one of the following fluoromonomers: tetrafluoroethylene, vinylidene fluoride, hexafluoropropylene, vinyl fluoride, trifluoroethylene and chlorotrifluoroethylene.

16. A method of providing a modified surface characteristic to fluoropolymer powder particles according to claim 11, wherein the fluoropolymer powder particles comprise at least one of
   the following polymers: polytetrafluoroethylene, polychlorotrifluoroethylene, polyvinylidene fluoride, polyvinylfluororide; or
   the following copolymers: tetrafluoroethylene-hexafluoropropylene, tetrafluoroethylene-perfluorovinylether, tetrafluoroethylene-ethylene, hexafluoroethylene-vinylidene fluoride, tetrafluoroethylene-ethylene, ethylene-chlorotrifluoroethylene; or
   terpolymers of: tetrafluoroethylene-hexafluoropropylene-vinylidene fluoride, or
   mixtures thereof.

17. A method of providing a modified surface characteristic to fluoropolymer powder particles according to claim 11, wherein the fluoropolymer powder particles have a particle size of less than about 100 microns.

18. A substrate coated with a surface treated fluoropolymer powder produced according to the method of claim 11.

19. A method of coating a substrate with a fluoropolymer material which comprises the steps of:
   a) providing a fluoropolymer powder;
   b) contacting the fluoropolymer powder with a macromolecular chemical species to coat particles of the fluoropolymer powder with macromolecules, the macromolecules being polymers consisting essentially of hydrophilic monomers;
   c) subjecting the coated particles from step b) to a process that immobilizes the macromolecules on the surface of the powder particles; and
   d) applying the surface treated particles to the surface of a substrate.

20. A method of coating a substrate with a fluoropolymer material according to claim 19, wherein the process to which the coated particles are subject to in step c) comprises at least one of atmospheric plasma treatment, x-ray radiation, electron radiation, ultraviolet radiation, and heating.

21. A method of coating a substrate with a fluoropolymer material according to claim 19, wherein the macromolecules are immobilized in step c) by cross-linking the macromolecules.

22. A method of coating a substrate with a fluoropolymer material according to claim 19, wherein the macromolecules consist essentially of at least one of polyvinyl alcohol, polyvinyl pyrrilidone, polyethylene glycol, poly acrylic acid, copolymers thereof, and mixtures thereof.

23. A method of coating a substrate with a fluoropolymer material according to claim 19, wherein the fluoropolymer powder particles are produced by polymerization of at least one of the following fluoromonomers: tetrafluoroethylene, vinylidene fluoride, hexafluoropropylene, vinyl fluoride, trifluoroethylene and chlorotrifluoroethylene.

24. A method of coating a substrate with a fluoropolymer material according to claim 19, wherein the fluoropolymer powder particles comprise at least one of: the following polymers: polytetrafluoroethylene, polychlorotrifluoroethylene, polyvinylidene fluoride, polyvinylfluororide; or the following copolymers: tetrafluoroethylene-hexafluoropropylene, tetrafluoroethylene-perfluorovinylether, tetrafluoroethylene-ethylene, hexafluoroethylene-vinylidene fluoride, tetrafluoroethylene-ethylene, ethylene-chlorotrifluoroethylene; or terpolymers of: tetrafluoroethylene-hexafluoropropylene-vinylidene fluoride, or mixtures thereof.

25. A method of coating a substrate with a fluoropolymer material according to claim 19, wherein the fluoropolymer powder particles have a particle size of less than about 100 microns.

26. A method of coating a substrate with a fluoropolymer material according to claim 19, wherein the surface treated particles are applied to the surface of the substrate by one of spraying, brushing and dipping.

27. A method of coating a substrate with a fluoropolymer material according to claim 19, wherein after being applied to the surface of the substrate the surface treated particles are heated above their melting point.

28. A dispersion comprising a surface treated fluoropolymer powder in a polar solvent, said fluoropolymer powder having macromolecules immobilized on the surfaces thereof, said macromolecules being polymers consisting essentially of hydrophilic monomers.

29. A dispersion according to claim 28, wherein the surface treatment fluoropolymer powder includes powder particles that have macromolecules immobilized thereon which present polar groups that react with polar groups in the polar solvent.

30. A dispersion according to claim 28, wherein the dispersion comprises a slurry.

31. A dispersion according to claim 28, wherein the dispersion comprises a paste.

32. A surface treated inert polymer powder which comprises:

powder particles of an inert polymer;

a layer of macromolecules on said powder particles, the macromolecules being polymers consisting essentially of hydrophilic monomers.

33. A surface treated inert polymer according to claim 32, wherein the inert polymer comprises at least one of polyether ether ketone and polyetherimide.

34. A method of providing a modified surface characteristic to inert polymer powder particles which comprises the steps of:

a) providing an inert polymer powder;

b) contacting the inert polymer powder with a macromolecular chemical species to coat particles of the inert polymer powder with macromolecules, the macromolecules being polymers consisting essentially of hydrophilic monomers; and c) subjecting the coated particles from step b) to a process that immobilizes the macromolecules on the surface of the powder particles.

35. A method of providing a modified surface characteristic to inert polymer powder particles according to claim 34, wherein the process to which the coated particles are subject to in step c) comprises at least one of atmospheric plasma treatment, x-ray radiation, electron radiation, ultraviolet radiation, and heating.

36. A method of providing a modified surface characteristic to inert polymer powder particles according to claim 34, wherein the inert polymer comprises at least one of polyether ether ketone and polyetherimide.

37. A surface treated fluoropolymer powder according to claim 1, wherein said macromolecules are polymers consisting essentially of a single, repeating hydrophilic monomer.

38. A method of providing a modified surface characteristic to fluoropolymer powder particles according to claim 11, wherein the macromolecules are polymers consisting essentially of a single, repeating hydrophilic monomer.

39. A method of coating a substrate with a fluoropolymer material according to claim 19, wherein the macromolecules are polymers consisting essentially of a single, repeating hydrophilic monomer.

40. A dispersion according to claim 28, wherein said macromolecules are polymers consisting essentially of a single, repeating hydrophilic monomer.

41. A surface treated inert polymer according to claim 32, wherein the macromolecules are polymers consisting essentially of a single, repeating hydrophilic monomer.

42. A method of providing a modified surface characteristic to inert polymer powder particles according to claim 39, wherein the macromolecules are polymers consisting essentially of a single, repeating hydrophilic monomer.

* * * * *